(12) United States Patent
Xu et al.

(10) Patent No.: US 7,267,191 B2
(45) Date of Patent: Sep. 11, 2007

(54) SYSTEM AND METHOD FOR BATTERY PROTECTION STRATEGY FOR HYBRID ELECTRIC VEHICLES

(75) Inventors: Jack Xu, Northville, MI (US); Ming Kuang, Canton, MI (US); Jing Song, Novi, MI (US); Tony Phillips, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 368 days.

(21) Appl. No.: 10/710,756

(22) Filed: Jul. 30, 2004

(65) Prior Publication Data

US 2006/0021809 A1    Feb. 2, 2006

(51) Int. Cl.
*B60L 9/00* (2006.01)

(52) U.S. Cl. .................. 180/65.2; 180/65.4

(58) Field of Classification Search ......... 180/65.1, 180/65.2, 65.3, 65.4, 68.5; 903/903, 943
See application file for complete search history.

(56) References Cited

U.S. PATENT DOCUMENTS

| | | |
|---|---|---|
| 5,550,445 A | 8/1996 | Nii |
| 5,778,997 A | 7/1998 | Setaka et al. |
| 6,123,163 A | 9/2000 | Otsu et al. |
| 6,233,508 B1 | 5/2001 | Deguchi et al. |
| 6,330,498 B2 | 12/2001 | Tamagawa et al. |
| 6,362,536 B1 | 3/2002 | Izumiura et al. |
| 6,362,580 B1 | 3/2002 | Omata et al. |
| 6,435,294 B1 | 8/2002 | Hara et al. |
| 6,452,286 B1 | 9/2002 | Kubo et al. |
| 6,464,026 B1 | 10/2002 | Horsley et al. |
| 6,504,259 B1 | 1/2003 | Kuroda et al. |
| 6,687,581 B2 * | 2/2004 | Deguchi et al. ............ 701/22 |
| 6,799,650 B2 * | 10/2004 | Komiyama et al. ........ 180/65.2 |
| 6,856,866 B2 * | 2/2005 | Nakao .................... 701/22 |
| 2002/0063002 A1 | 5/2002 | Lasson |
| 2003/0052650 A1 | 3/2003 | Gunji |

\* cited by examiner

*Primary Examiner*—Christopher P. Ellis
*Assistant Examiner*—Brian Swenson
(74) *Attorney, Agent, or Firm*—David B. Kelley; Brooks Kushman P.C.

(57) ABSTRACT

A method for controlling a hybrid powertrain system includes the steps of determining a first power state of the hybrid powertrain system, limiting electrical power generated by a generator to the minimum of the rated power limit of the generator and the first power state, when the first power state is greater than zero, and limiting the electrical power generated by the generator to zero, and limiting the power limit of an electric machine during generating to a first operating condition of the hybrid powertrain system, when the first power state is less than or equal to zero, to provide over-charge protection to the battery. The method further includes steps that provide over-discharge protection to the battery.

26 Claims, 5 Drawing Sheets

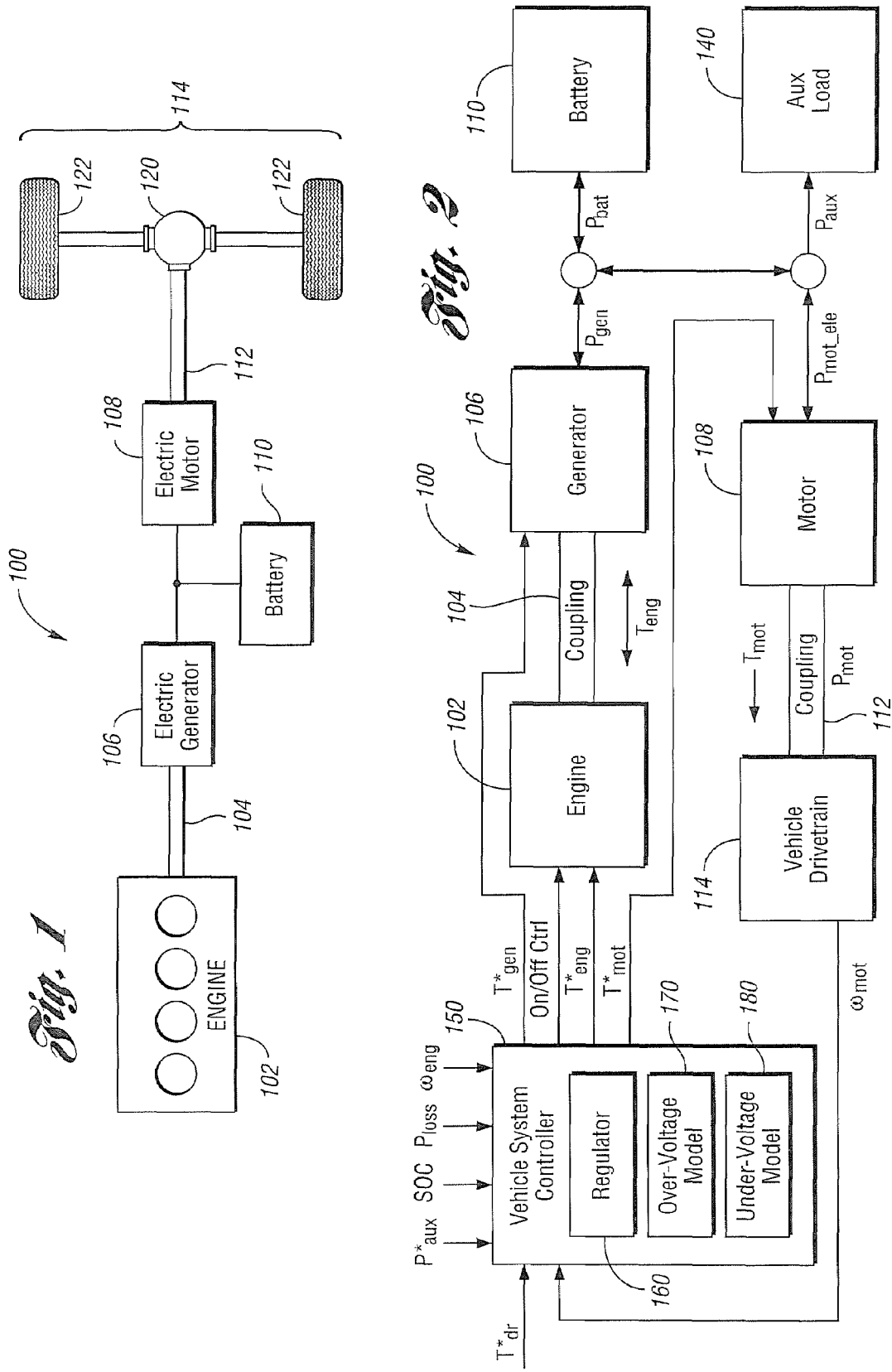

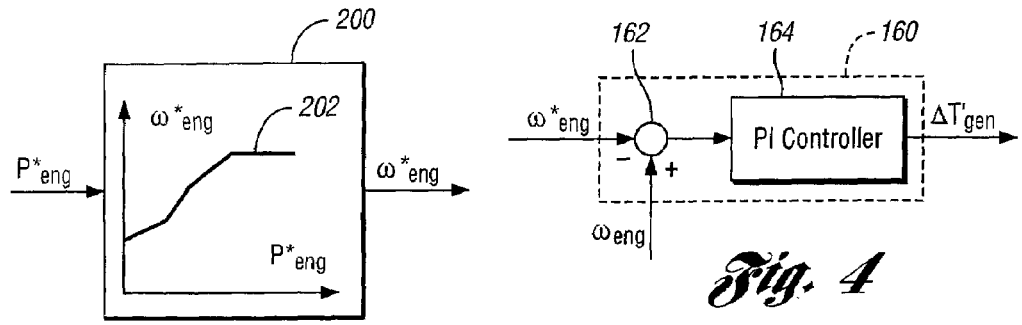
Fig. 3
Fig. 4
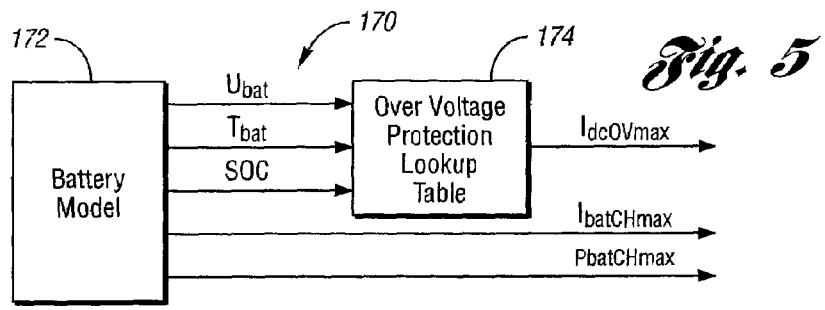
Fig. 5
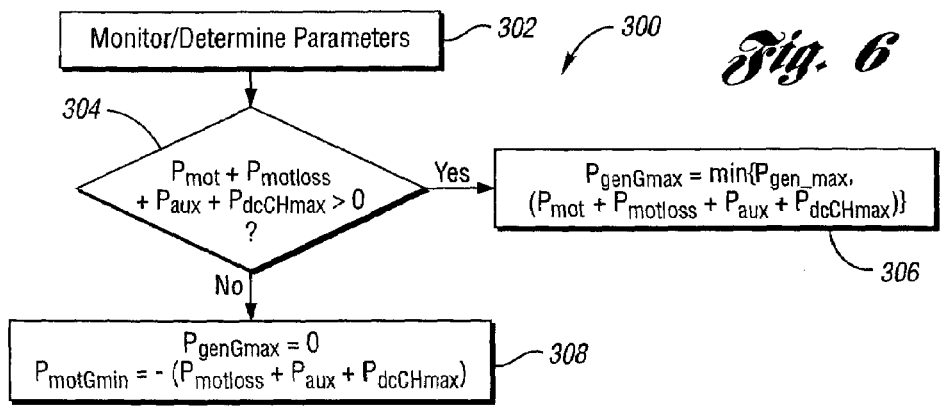
Fig. 6
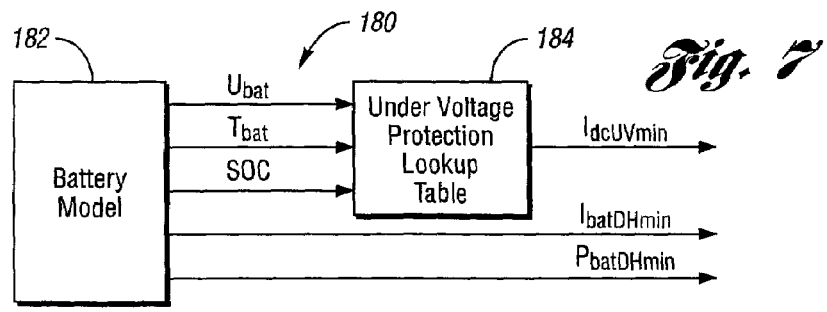
Fig. 7

SYSTEM AND METHOD FOR BATTERY PROTECTION STRATEGY FOR HYBRID ELECTRIC VEHICLES

BACKGROUND OF INVENTION

1. Field of the Invention

The invention relates generally to a system and method for vehicle battery protection, and more particularly to battery under-charge and battery over-charge protection for series and series-parallel hybrid electric vehicles.

2. Background Art

In general, a hybrid electric vehicle (HEV) has four major power generation/conversion components. The power generation/conversion components include an internal combustion engine, a generator, an electric machine that performs as a motor in one mode of operation and as a generator in another mode of operation and a battery (or other appropriate energy storage unit such as an ultra capacitor in some cases). There are basically three different configurations for the HEV, depending on how the engine, generator and electric machine are connected. The three types of HEV configurations are series HEV, parallel HEV and series-parallel HEV.

During the normal drive mode of vehicle operation, the generator (except the case of parallel HEV) will convert mechanical energy into electrical energy and supply the electrical energy to the electric machine and battery. The electric machine will turn the electrical energy back to mechanical energy to drive the wheels. For the engine start operation, however, the generator will perform as a motor and will consume the battery energy as does the electric machine. Conversely, the electric machine will perform as a generator during braking (i.e., regenerative braking) to convert vehicle kinetic energy into electrical energy and charge the battery using the electrical energy generated by regenerative braking. The electrical power generated/consumed by the generator and the electric machine is controlled by a vehicle control system.

One example of a conventional approach to battery protection for hybrid electric vehicles is the system and method disclosed in U.S. Patent Application 2003/0052650. A hybrid control module determines various discharge and recharge allowances and limits for operation of the battery with different operating conditions of the hybrid electric vehicle. It also determines various periods of time and limits operation of the battery with different operating conditions of the hybrid electric vehicle. The allowances and periods of time may be used as limits that are imposed on commands for the motor.

However, the battery may be over-charged or over-discharged when the battery limits (e.g., for current, voltage or power) may not be considered properly in calculating the generator power command (P*gen) and the motor power command (P*mot) using such conventional approaches. The battery over-charge, over-discharge or over-power may cause battery damage and result in vehicle shut down, or quit on road (QOR) conditions, and potential user dissatisfaction.

It would be desirable to have a system and method for a battery protection strategy for hybrid electric vehicles that reduces or eliminates battery over-charge and battery over discharge conditions.

SUMMARY OF INVENTION

A hybrid electric vehicle (HEV) system and method is disclosed that substantially overcomes the limitations and shortcomings of conventional HEV control systems and methods. In accordance with one embodiment of the present invention, a method for controlling a hybrid powertrain system for an automotive vehicle operated by a user is provided. The system has an engine, an electric machine that performs as a motor in one mode of operation and performs as a generator in another mode of operation, a battery connected to the electric machine, and a generator configured to receive mechanical power from the engine and to present electrical power to at least one of the electric machine and the battery, and at least one of the engine and the electric machine establish a power source for providing power to vehicle traction wheels. The method includes the steps of determining a first power state of the hybrid powertrain system, limiting electrical power generated by the generator to the minimum of the rated power limit of the generator and the first power state, when the first power state is greater than zero, and limiting the electrical power generated by the generator to zero, and limiting the power limit of the electric machine during generating to a first operating condition of the hybrid powertrain system, when the first power state is less than or equal to zero, to provide over-charge protection to the battery.

Further, when engine start is of higher priority to the user than drive performance, the method can include the steps of limiting the power limit of the electric machine during motoring to the minimum of the rated power limit of the electric machine, and the negative of a second operating condition of the hybrid powertrain system, when the second operating condition is less than zero, determining when a third operating condition of the hybrid powertrain system is less than zero, when the second operating condition is equal to or greater than zero, limiting the auxiliary loads to the minimum power for maintaining the vehicle operation, and limiting the power limit of the electric machine during motoring to the minimum of the rated power limit of the electric machine and the negative of the third operating condition, when the third operating condition is less than zero, and adjusting an engine start strategy to provide earlier starting of the engine, when both the second and the third operating conditions are equal to or greater than zero, to provide over-discharge protection to the battery.

Yet further, when drive performance is of higher priority to the user than engine start, the method can include the steps of limiting the electrical power of the generator during motoring to the maximum of the negative of the rated power limit of the generator, and a fourth operating condition of the hybrid powertrain system, when the fourth operating condition is less than zero, determining when a fifth operating condition of the hybrid powertrain system is less than zero, when the fourth operating condition is equal to or greater than zero, limiting the actual total power consumed by the auxiliary loads to the minimum auxiliary power requested, and limiting the electrical power of the generator during motoring to the maximum of the negative of the rated power limit of the generator and the fifth operating condition, when the fifth operating condition is less than zero, and adjusting an engine start strategy to provide earlier starting of the engine, when the fifth operating condition is equal to or greater than zero, to provide over-discharge protection to the battery.

The present invention generally provides a robust control system for reducing or preventing a hybrid electric vehicle (HEV) electric power storage device (e.g., battery) from at least one of over charging and over discharging. The present invention will generally prolong battery life and reduce or prevent the vehicle from having quit on road (QOR) conditions due to battery over limit conditions.

The present invention generally provides a strategy for determining the hybrid electric vehicle generator and motor power limits under different operating (e.g., driving, idling, etc.) conditions. Operation of the generator and motor within the generator and motor power limits will generally prevent the battery from over power/current and from under/over voltage during either charging or discharging and hence will reduce or eliminate the QOR due to over-charge and over-discharge of the battery.

Further advantages, objectives and features of the invention will become apparent from the following detailed description and the accompanying figures disclosing illustrative embodiments of the invention.

BRIEF DESCRIPTION OF DRAWINGS

FIG. 1 is a diagram of a series hybrid electric vehicle (HEV) configuration;

FIG. 2 is a control diagram of a series HEV of the present invention;

FIG. 3 is a plot of engine speed command determination;

FIG. 4 is a diagram of an engine speed regulation controller;

FIG. 5 is a diagram of a partial model for over-charge protection of a battery;

FIG. 6 is a flow diagram of an over-charge protection strategy of the present invention;

FIG. 7 is a diagram of a partial model for over discharge protection of a battery;

DETAILED DESCRIPTION

Figure 8:
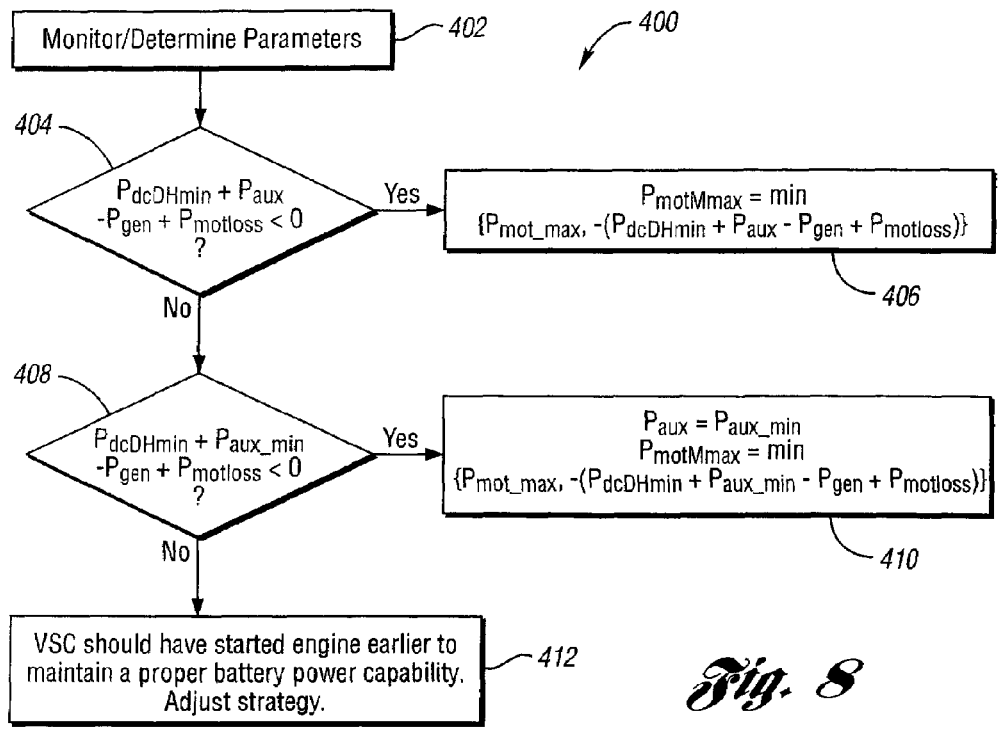
FIG. 8 is a flow diagram of an over discharge protection strategy of the present invention.

A hybrid electric vehicle (HEV) generally comprises four major power generation/conversion components. The power generation/conversion components generally comprise an internal combustion engine, a generator, an electric machine that performs as a motor in one mode of operation and as a generator in another mode of operation, and a battery (or another power storage device such as a capacitor, an ultra capacitor, a cell, and the like instead of the battery in some cases). There are basically three different configurations for the HEV that relate to how the engine, generator and motor are connected (i.e. coupled, interfaced, hooked up, etc.). The three HEV configurations are series HEV, parallel HEV, and series-parallel HEV. The parallel HEV configuration may be implemented without a generator and the motor may perform as a motor/generator.

The present invention may provide a system and a method for a battery protection strategy that may be advantageously implemented in connection with series HEV and series-parallel HEV types of HEV configurations. The present invention is first described in connection with a series HEV configuration and then generalized to the series-parallel HEV configuration.

Series HEV Configuration

Referring to FIG. 1, a series HEV configuration 100 is shown. The series HEV 100 generally comprises an electric vehicle powertrain (e.g., an electric machine 108 electrically coupled to and receiving electrical power from an energy storage device 110, typically a battery) and a generator 106 driven by an internal combustion engine 102 through a mechanical coupling (e.g., drive shaft) 104 to supply the battery 110/electric machine 108 with electrical energy. The electric machine 108 generally provides mechanical power to the vehicle drivetrain 114 through a mechanical coupling (e.g., drive shaft) 112. The drivetrain 114 may include an axle/differential assembly 120 and vehicle traction wheels 122. The energy storage device 110 may be implemented as a battery, a capacitor, an ultra capacitor, a cell, or other appropriate device to meet the design criteria of a particular application.

From the energy flow point of view, the output of the engine 102/generator 106 is connected in series with the electric motor 108. The engine 102 output (i.e., mechanical energy) is not directly delivered to the driven wheels 122 but rather is converted into electrical energy by the generator 106. The electrical energy is further converted into mechanical energy by the electric motor 108 and transferred to the driven wheels 122, and into electro-chemical energy by the battery 110 when the generator 106 produces more energy/power than is consumed by the motor 108.

The motor 108 is generally implemented as an electric machine configured such that in a motoring mode of operation (i.e., condition, state, etc.), electrical power flows from either the generator 106 or the battery 110 to the electric machine 108. In a charging mode, electrical power flows from the generator 106 to the battery 110. In a regenerative braking mode, electrical power flows from the electric machine 108 (performing as a generator) to the battery 110.

As depicted in the FIG. 1, in a series HEV 100 powertrain configuration the engine 102 is not mechanically connected to the driven wheels 122. Instead, the output power/energy from the engine 102 is transmitted to the driven wheels 122 by the generator 106 and the electric machine 108 (i.e., via energy conversion from mechanical to electrical energy and back to mechanical energy). Auxiliary loads (shown in FIG. 2, e.g., air conditioner compressor, heated back light, power windows, entertainment system, etc.) may also receive power from the generator 106, the electric machine 108 or the battery 110, as appropriate. Therefore, the series HEV configuration generally provides the potential to operate the engine 102 in a desired region (e.g., around the optimal brake specific fuel consumption, BSFC curve) in some modes of vehicle 100 operation.

Clearly, the series HEV configuration 100 is similar to a continuous variable transmission (CVT) powertrain in a conventional vehicle. In addition, the electric machine 108 can be used to recover some of the vehicle kinetic energy by operating as a generator during braking through the regenerative braking mode of operation. Therefore, a series HEV configuration 100 can potentially improve the fuel economy of the vehicle, reduce emissions, etc. when compared to conventional non-hybrid vehicle approaches. A vehicle system control (described in more detail below in connection with FIG. 2) is generally implemented in connection with the HEV 100 to achieve the potential fuel economy improvement and other advantages in a series HEV.

The following definitions, symbols, indicia, signals, parameters, factors, and conventions (followed by units of measure and typical range indicated in parentheses) are used throughout the Detailed Description.

BSFC=Brake specific fuel consumption.

P*eng=commanded (i.e., requested, desired, demanded, etc. by a user) engine output power (W)

Peng=actual engine output power (W)

P'gen=steady state portion of the commanded generator output power ("+"=generating, "−"=motoring)

ΔP'gen=transient state portion of the commanded generator output power for engine speed regulation P*gen=P'gen+ΔP'gen, commanded generator output electrical power ("+"=generating, "−"=motoring)

Pgen actual generator output electrical power ("+"=generating, "−"=motoring)

PgenGmax=min {Pgen_max, (Pmot+Pmotloss+Paux+PdcCHmax)} as described below in connection with FIG. 6, generator power during generating (electrical) ($\geq 0$)

PgenMmin=max {−Pgen_max, (PdcDHmin+Paux+Pmot+Pmotloss)} or, alternatively, =max{−Pgen_max, (PdcDHmin+Paux_min+Pmot+Pmotloss)} as described below in connection with FIG. 9, generator power during motoring (electrical) ($\leq 0$)

Pgen_max=generator rated power limit (>0) (W)

Pgenloss=actual generator power loss ($\geq 0$) (W)

P*mot=commanded motor mechanical output power ("+"=motoring, "−"=generating)

Pmot=actual motor mechanical output power ("+"=motoring, "−"=generating)

PmotMmax=min {Pmot_max, −(PdcDHmin+Paux−Pgen+Pmotloss)} or, alternatively, =min {Pmot_max, −(PdcDHmin+Paux_min−Pgen+Pmotloss)} as described below in connection with FIG. 8, motor power limit during motoring ($\geq 0$)

PmotGmin=−(Pmotloss+Paux+PdcCHmax) as described below in connection with FIG. 6, motor power limit during generating ($\leq 0$)

Pmotloss=actual motor power loss ($\geq 0$)

Pmot_max=motor rated power limit (>0)

Pmot_ele=Pmot+Pmotloss, actual motor electrical input power

P*aux=commanded total auxiliary power at high voltage terminal ($\geq 0$)

Paux=actual total auxiliary power at high voltage terminal ($\geq 0$)

Paux_min=the minimum auxiliary power requested at high voltage terminal (i.e., the minimum power for maintaining the vehicle operation) ($\geq 0$)

P*bat=commanded battery charge power ($\geq 0$) or, alternatively, battery discharge power (<0)

Pbat=actual battery charge power ($\geq 0$) or, alternatively, battery discharge power (<0) (W)

Ploss=actual power loss of both generator and motor ($\geq 0$) (W)

PbatCHmax=rated battery charge power limit ($\geq 0$) (from the battery controller)

PdcCHmax=min {PbatCHmax, Ubat×IdcCHmax}, rated battery charge power limit for protecting battery from over-current, over-voltage and over-power during charging ($\geq 0$)

PbatDHmin=rated battery discharge power limit ($\leq 0$) (from the battery controller)

PdcDHmin=max {PbatDHmin, Ubat×IdcDHmin} battery discharge power limit for protecting battery from over-current, under-voltage and over-power during discharging ($\leq 0$)

QOR=Quit on road. Vehicle is unable to proceed under its own power.

ωmot=actual motor speed (rotational velocity, radians per second, RPS)

ω*eng=commanded engine speed (RPS)

ωeng=actual engine speed (RPS)

T*eng=commanded engine output torque (Nm)

Teng=actual engine output torque (Nm)

T'gen=steady state portion of the commanded generator output torque ("+"=generating, "−"=motoring);

ΔT'gen=transient state portion of the commanded generator output torque for engine speed regulation T*gen=T'gen+ΔT'gen, commanded generator output torque ("+"=generating, "−"=motoring)

Tgen=actual generator output torque ("+"=generating, "−"=motoring)

T*mot=commanded motor output torque ("+"=motoring, "−"=generating)

Tmot=actual motor output torque ("+"=motoring, "−"=generating)

T*dr=driver demanded torque at motor shaft

Tbat=battery temperature (° C.)

On/Off Ctrl=Control signal for engine start/stop

Ubat=battery voltage ($\geq 0$) (V)

Ubat_max=maximum battery voltage limit (>0) from the battery controller (V)

Ubat_min=minimum battery voltage limit (>0) from the battery controller

SOC=battery state of charge (%)

IdcOVmax=battery charge current limit ($\geq 0$) for protecting battery from over-voltage (i.e., for avoiding battery over-voltage)(Ubat>Ubat_max) as determined through battery testing to be implemented at different Ubat, Tbat, and SOC conditions representative of design criteria for a particular application IbatCHmax=rated battery charge current limit ($\geq 0$) (from the battery controller) (A)

IdcCHmax=min {IbatCHmax, IdcOVmax}, battery charge current limit ($\geq 0$)

IdcUVmin=battery discharge current limit ($\leq 0$) for protecting battery from under-voltage (i.e., for avoiding battery under-voltage) (Ubat<Ubat_min) as determined through battery testing to be implemented at different Ubat, Tbat, and SOC conditions representative of design criteria for a particular application IbatDHmin=rated battery discharge current limit ($\leq 0$) (from the battery controller)

IdcDHmin=max {IbatDHmin, IdcUVmin}, battery discharge current limit ($\leq 0$)

General Control Strategy

Referring to FIG. 2, a diagram of a vehicle system control of the present invention implemented in connection with the HEV 100 is shown. The HEV 100 generally includes a vehicle system controller (VSC) 150. The controller 150 generally determines power demanded by the user (e.g., a driver of the vehicle) and manages (i.e., controls) the power required to charge the battery 110 such that the battery 110 is maintained within predetermined charge and discharge limits (i.e., values, states, conditions, levels, etc.) to reduce or prevent the battery 110 from over power/current and from under/over voltage violations and hence will reduce or eliminate the QOR conditions due to either over charge, or over discharge of the battery 110. A number of states and conditions (e.g., power states and operating conditions of the HEV system 100) are generally determined and evaluated using a controller such as the VSC 150.

The controller 150 generally comprises a regulator 160, a battery over voltage model 170, and a battery under voltage model 180. The controller 150 may have inputs that receive signals (i.e., commands, requests, etc.) related to (i.e., corresponding to, representative of, etc.) P*aux, SOC, Ploss, ωeng, T*dr, and ωmot (e.g., from the electric machine 108 via the vehicle drivetrain 114). The VSC 150 may have outputs that present (i.e., send, transmit, etc.) signals related to T*gen (e.g., to the generator 106), On/Off Ctrl (e.g., to the engine 102), T*eng (e.g., to the engine 102), T*mot (e.g., to the electric machine 108). The models 170 and 180 are generally implemented in memory (e.g., random access memory (RAM), read only memory (ROM), EPROM, BEPROM, flash, etc.) in the controller 150.

The torque Teng may be presented/received between the engine 102 and the generator 106 (e.g., via the coupling 104). Pgen, Pbat, Pmot_ele, and Paux may be presented/received (exchanged) between the generator 106, the battery 110, the electric machine 108, and an auxiliary load 140.

During steady state operation, the engine 102 power demand P*eng can be determined (e.g., calculated) based on the power balance as follows.

P*mot=T*dr×ωmot

P'gen=P*mot+Pmotloss+P*aux+P*bat

P*eng=P'gen+Pgenloss

Referring to FIG. 3 (with continued reference to FIG. 2), an engine speed command (i.e., request, control signal, etc.) determination plot 200 is shown. For the given engine power demand, the engine speed command ω*eng can be determined from an engine speed versus engine power (P*eng) curve 202. The engine speed versus engine power curve 202 is generally derived from (i.e., related to, corresponds to. etc.) an appropriate optimum BSFC curve (torque versus speed). The engine 102 generally tracks the engine speed command for operation in the optimum fuel economy region for the given engine power demand.

Further, the engine torque command can be determined by dividing the engine power demand by the current engine speed:

T*eng=P*eng/ωeng

The steady state portion of the generator torque command is generally set such that T'gen=T*eng.

For engine speed regulation during transient operating conditions of the HEV 100 (e.g., vehicle acceleration, vehicle deceleration, air conditioner engagement/disengagement, etc.), the engine speed error dependent control signal ΔT'gen is added to the T'gen, and the final generator torque command is T*gen=T'gen+ΔT'gen.

Referring to FIG. 4 (with continued reference to FIG. 2), a detailed diagram of the engine speed regulation device (regulator) 160 is shown. The device 160 generally comprises a combiner 162 and a controller 164. The combiner 162 may combine the signals related to ω*eng and ωeng and present the combined signal to the controller 164. In one example, the controller 164 may be implemented as a proportional integral (PI) controller. In another example, the controller 164 may be implemented as a proportional integral derivative (PID) controller. However, the controller 164 may be implemented as any appropriate controller that determines the value ΔT'gen in response to the combination of ω*eng and ωeng to meet the design criteria of a particular application. The regulator 160 may be advantageously implemented to control the vehicle 100 during transient operating conditions.

Accordingly,

P*gen=P'gen+ΔP'gen.

Low Power Level Control Strategy

In general, when the P*eng calculated is low and battery SOC is high, the engine 102 is shut down (turned off, the signal O/Off Ctrl is present in the off state), and electrical power from the battery 110 is used to drive the vehicle 100 via the electric machine 108. Although operation of the engine 102 generally follows the optimum fuel economy curve (e.g., the curve 202), the engine 102 efficiency is typically low at low engine power level. When either the P*eng=high state (i.e., above a predetermined value or threshold) or the battery SOC=low state (i.e., below a predetermined value or threshold) is detected, the engine 102 is generally started (e.g., the signal O/Off Ctrl is present in the on state), and electrical power from the battery 110 is used to drive substantially immediately by operation of the generator 106 as a starting motor, such that engine 102 power can be used to meet the energy demanded by the user.

Problem Description

As noted in the Background, in conventional approaches, the HEV battery may be over charged or over discharged when the battery limits (e.g., limits for current, voltage or power charge and discharge) are not considered properly when P*gen, P*mot, P*gen and P*mot are determined. Battery over charge or over discharge conditions may especially occur during the transient engine speed regulation. The battery over charge or over discharge conditions may cause battery damage and may result in vehicle shut down, or QOR conditions.

The present invention generally provides system and a method for a strategy for determining the generator 106 and the electric machine 108 power limits under a variety of different driving conditions. Operating the generator 106 and the electric machine 108 within the predetermined over charge or over discharge limits using the system and method of the present invention will generally reduce or prevent the battery 110 from power/voltage/current limit violation and hence will reduce, prevent, or eliminate the QOR due to the battery 110 over charge and/or over discharge. The following is a detailed description of the strategy implemented via the system and method for battery protection of the present invention.

Over-Charge Protection for a HEV

Referring to FIG. 5, a battery over-voltage protection model (i.e., strategy) 170 is shown. The over-voltage protection model 170 may be used to determine the battery charge current limit IdcOVmax ($\geq 0$) for protecting the battery from over-voltage (Ubat>Ubat_max), the rated battery charge current limit IbatCHmax ($\geq 0$) and the rated battery charge power limit PbatCHmax ($\geq 0$).

The strategy 170 generally comprises a battery model 172 (e.g., a representation of the battery 110 that is determined via testing and is generally stored in the controller 150) and a lookup table (LUT) 174. The LUT 174 generally receives the parameters (or corresponding signals) Ubat, Tbat and SOC, and presents the value (or corresponding signal) IdcOVmax. The values (or corresponding signals) IbatCHmax and PbatCHmax are generally presented by the model 172.

The strategy 170 generally includes a model for over-charge protection of the battery 110 that receives a voltage of the battery 110, a temperature of the battery 110, and a state of charge (SOC) of the battery 110, and presents a charge current limit of the battery for over-voltage protection, a rated charge current limit signal for over-current protection, and a rated battery charge power limit.

For a further description of the strategy 170, the following definitions are used.

IdcCHmax=min {IbatCHmax, IdcOVmax}(for over current/voltage protection)

PdcCHmax=min {PbatCHmax, Ubat×IdcCHmax}(for over current/voltage/power protection)

Initially, the battery system generally operates at a normal state without any over-voltage, over-current or over-power. During the battery charge operation, when Pbat<PdcCHmax, the following relationships are generally in effect.

Ibat<IbatCHmax (no over charge current)
Ubat<Ubat_max (no over voltage)
Pbat<PbatCHmax (no over charge power)

As a result, the battery 110 is generally protected from an over-charge condition.

To ensure that Pbat<PdcCHmax during a normal driving mode of operation without the engine 102 initiating a starting mode, Pbat=Pgen−Pmot_ele−Paux=Pgen−Pmot−Pmotloss−Paux, and Pbat<PdcCHmax when Pgen−Pmot−Pmotloss−Paux<PdcCHmax.

As a result, the maximum generator 106 generating power permitted, PgenGmax, and the minimum electric machine 108 regenerating power permitted, PmotGmin, may be calculated (i.e., determined), in one example, using an algorithm (i.e., routine, steps, method, process, operation, calculation, etc.) as follows.

(1) If Pmot+Pmotloss+Paux+PdcCHmax>0
genGmax=min {Pgen_max, (Pmot+Pmotloss+Paux+PdcCHmax)} Else (Pmot<0, electric machine unequivocally in regenerative mode of operation)
PgenGmax=0 (generator not permitted to generate) PmotGmin=−(Pmotloss+Paux+PdcCHmax)
End Referring to FIG. 6, a flow diagram 300 illustrating a battery over-charge protection strategy (e.g., a strategy implemented in connection with the model 170) of the present invention is shown. The strategy 300 may be implemented via the routine (1) above in connection with the HEV 100. A VSC (e.g., the controller 150) may monitor and determine appropriate vehicle and vehicle component parameters (block or step 302). The parameters that are determined via the block 302 are generally related to a power state of the hybrid powertrain system 100. The VSC may determine whether Pmot+Pmotloss+Paux+PdcCHmax>0 (decision block or step 304). The condition of block 304 may be stated alternatively as the negative sum of motor power, motor power loss and auxiliary power is smaller than PdcCHmax (no matter whether the sum is positive, negative or zero). Yet another alternative statement of the condition of the block 304 is the negative sum of motor power, motor power loss and auxiliary power is smaller than PdcCHmax (no matter whether the sum is positive, negative or zero).

When Pmot+Pmotloss+Paux+PdcCHmax>0, PgenGmax=min {Pgen_max, (Pmot+Pmotloss+Paux+PdcCHmax)} (block or step 306). Returning to decision block 304, when Pmot+Pmotloss+Paux+PdcCHmax≦0, PgenGmax=0, and PmotGmin=−(Pmotloss+Paux+PdcCHmax) (block or step 308). The condition of block 308 may be stated alternatively as limiting the generator maximum generating power to zero and limiting the motor generating power to the sum of motor power loss, auxiliary power and PdcCHmax.

Over-Discharge Protection For a HEV

Referring to FIG. 7, a battery under-voltage protection model (i.e., strategy) 180 is shown. The under-voltage protection model 180 may be used to determine the battery discharge current limit IdcUVmin (<0) for protecting the battery from under-voltage (Ubat<Ubat_min), the rated battery discharge current limit IbatDHmin (≦0), and the rated battery discharge power limit PbatDHmin (≦0).

The strategy 180 generally comprises a battery model 180 (e.g., a representation of the battery 110 that is determined via testing and is generally stored in the controller 150) and a lookup table (LUT) 184. The LUT 184 generally receives the parameters (or corresponding signals) Ubat, Tbat and SOC, and presents the value (or corresponding signal) IdcUVmin. The values (or corresponding signals) IbatDHmin and PbatDHmin are generally presented by the model 182.

The strategy 180 generally includes a model for under-voltage protection for the battery 110 that receives the voltage of the battery 110, the temperature of the battery 110, and the SOC of the battery 110, and presents a discharge current limit of the battery 110 for under-voltage protection, a rated battery discharge current limit for over-current protection, and a rated battery discharge power limit.

For a further description of the strategy 180, the following definitions are used.

IdcDHmin=max {IbatDHmin, IdcUVmin} (for over discharge current protection and under voltage protection)

PdcDHmin=max {PbatDHmin, Ubat×IdcDHmin} (for over discharge power/current protection and under voltage protection)

Initially, the battery system operates at a normal state (i.e., without any under-voltage, and over-discharge of current and power). During the battery 110 discharge, when Pbat>PdcDHmin, the following relationships are generally in effect.

Ibat>IbatDHmin (no over discharge current)
Ubat>Ubat_min (no under voltage)
Pbat>PbatDHmin (no over discharge power)

As a result, battery 110 is generally protected from an over-discharge condition.

To ensure that Pbat>PdcDHmin during a normal driving mode of operation that includes engine 102 start operations, as commanded to maintain the predetermined SOC in the battery 110 (i.e., generator 106 motoring), the same power balance equation as described above is generally implemented, that is Pbat=Pgen−Pmot_ele−Paux=Pgen−Pmot−Pmotloss−Paux Thus, Pbat>PdcDHmin when Pgen−Pmot−Pmotloss−Paux>PdcDHmin. As a result, when engine start is selected as higher priority than other modes of operation such as drive performance, the electric machine motoring power limit for protecting the battery 110 from over discharge, PmotMmax, is generally determined using the algorithm (i.e., routine, steps, determination, method, process, operation, calculation, etc.) as follows.

(2) If PdcDHmin+Paux−Pgen+Pmotloss<0PmotMmax=min {Pmot_max, −(PdcDHmin+Paux−Pgen+Pmotloss)}
Elseif PdcDHmin+Paux_min−Pgen+Pmotloss<0
Paux=Paux_min (reduce auxiliary power to minimum Paux_min)
PmotMmax=min {Pmot_max, −(PdcDHmin+Paux_min−Pgen+Pmotloss)}
Else (battery power is not enough even for starting engine)
VSC should have started engine earlier to maintain a proper battery power capability
End To overcome the condition where battery 110 power is not enough even for starting the engine 102, the battery protection strategy of the present invention is generally modified (i.e., adjusted, revised, updated, etc.) (e.g., to provide an the engine start portion of the signal On/Off Ctrl) to provide an earlier engine 102 start. However, engine 102 control strategy including earlier charging to the battery 110 (e.g., starting the engine 102 earlier) may be provided via any appropriate controller.

Referring to FIG. 8, a flow diagram 400 illustrating a battery over-discharge protection strategy (e.g., a strategy implemented in connection with the model 180) of the present invention is shown. The strategy illustrated in the routine 400 may be advantageously implemented when engine start is of higher priority than other modes of operation such as drive performance. The strategy 400 may be implemented via the routine (2) above in connection with the HEV 100. A VSC (e.g., the controller 150) may monitor and determine appropriate vehicle and vehicle component parameters (block or step 402). The parameters that are determined via the block 402 are generally related to a power state of the hybrid powertrain system 100. The VSC may determine whether PdcDHmin+Paux−Pgen+Pmotloss<0 (decision block or step 404). The condition of block 404 may be stated alternatively as the sum of motor power loss and auxiliary power minus generator power is smaller than the magnitude of PdcDHmin.

When PdcDHmin+Paux−Pgen+Pmotloss<0, PmotMmax=min {Pmot_max, −(PdcDHmin+Paux−Pgen+Pmotloss)} (block or step 406). Returning to decision block 404, when PdcDHmin+Paux−Pgen+Pmotloss≧0, the VSC 150 may determine whether PdcDHmin+Paux_min−Pgen+Pmotloss<0 (decision block or step 408). The condition of block 408 may be stated alternatively as the sum of motor power loss and the minimum auxiliary power minus generator power is smaller than the magnitude of PdcDHmin.

When PdcDHmin+Paux_min−Pgen+Pmotloss<0, Paux=Paux_min, and PmotMmax=min {Pmot_max, (PdcDHmin+Paux_min−Pgen+Pmotloss)} (block or step 410). Returning to decision block 408, when PdcDHmin+Paux_min−Pgen+Pmotloss≧0, the VSC 150 should have started the engine 102 earlier to maintain a proper battery 110 power capability, and the strategy 400 may be adjusted as indicated above.

To overcome the condition where battery 110 power is not enough even for starting the engine 102, the battery protection strategy of the present invention is generally modified as described above in connection with routine (2).

Similarly, when drive performance is selected to be of higher priority than other modes of operation such as engine start, the generator motoring power limit for protecting the battery 110 from over discharge, PgenMmin, may be determined (e.g., calculated) as follows.

(3) If PdcDHmin+Paux+Pmot+Pmotloss<0
PgenMmin=max {−Pgen_max, (PdcDHmin+Paux+Pmot+Pmotloss)}
Elseif PdcDHmin+Paux_min+Pmot+Pmotloss<0
Paux=Paux_min (reduce auxiliary power to minimum Paux_min)
PgenMmin=max {−Pgen_max, (PdcDHmin+Paux_min+Pmot+Pmotloss)}
Else (battery power is not enough even for driving electric machine as motor)
VSC should have started engine earlier to ensure availability of adequate power for starting and desired driving performance
End To overcome the condition where battery 110 power is not enough even for starting the engine 102, the battery protection strategy of the present invention is generally modified as described above in connection with routine (2).

Figure 9:
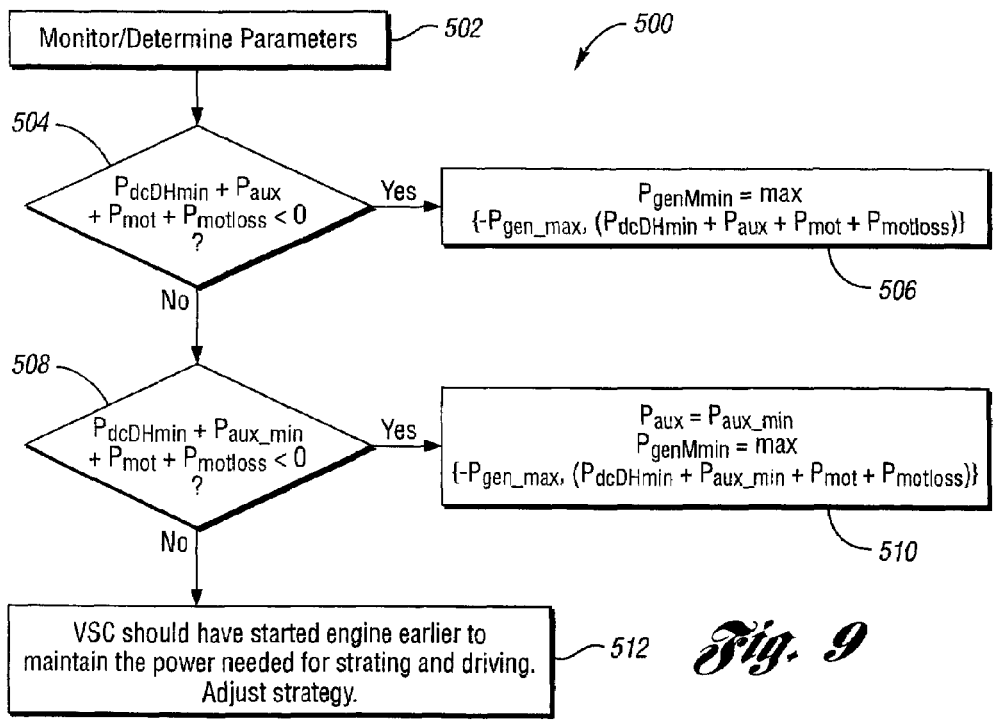
FIG. 9 is a flow diagram of another over discharge protection strategy of the present invention.

Referring to FIG. 9, a flow diagram 500 illustrating a battery over-discharge protection strategy of the present invention is shown. The strategy illustrated in the routine 500 may be advantageously implemented when drive performance is of higher priority than other modes of operation such as engine start. The strategy 500 may be implemented via the routine (3) above in connection with the HEV 100. A VSC (e.g., the controller 150) may monitor and determine appropriate vehicle and vehicle component parameters (block or step 502). The VSC may determine whether PdcDHmin+Paux+Pmot+Pmotloss<0 (decision block or step 504). The condition of block 504 may be stated alternatively as the sum of motor power, motor power loss and auxiliary power is smaller than the magnitude of PdcDHmin.

When PdcDHmin+Paux+Pmot+Pmotloss<0, PgenMmin=max {−Pgen_max, (PdcDHmin+Paux+Pmot+Pmotloss)} (block or step 506). Returning to decision block 504, when PdcDHmin+Paux+Pmot+Pmotloss≧0, the VSC 150 may determine whether PdcDHmin+Paux_min+Pmot+Pmotloss<0 (decision block or step 508). The condition of block 508 may be stated alternatively as the sum of motor power, motor power loss and minimum auxiliary power is smaller than the magnitude of PdcDHmin.

When PdcDHmin+Paux_min+Pmot+Pmotloss<0, Paux=Paux_min, and PgenMmin=max {−Pgen_max, (PdcDHmin+Paux_min+Pmot+Pmotloss)} (block or step 510). Returning to decision block 508, when PdcDHmin+Paux_min+Pmot+Pmotloss>0, the VSC 150 should have started the engine 102 earlier to ensure the availability of power for the vehicle 100 starting and drive performance desired by the user, and the strategy 500 may be adjusted as indicated above to start the engine 102 earlier.

Application of the Present Invention for Other HEV Configurations

The present invention is described above in connection with a series HEV. However, the present invention can be advantageously applied as well to other HEV configurations (e.g., series-parallel HEV configurations) as follows.

Series-Parallel HEV Configuration

Figure 10:
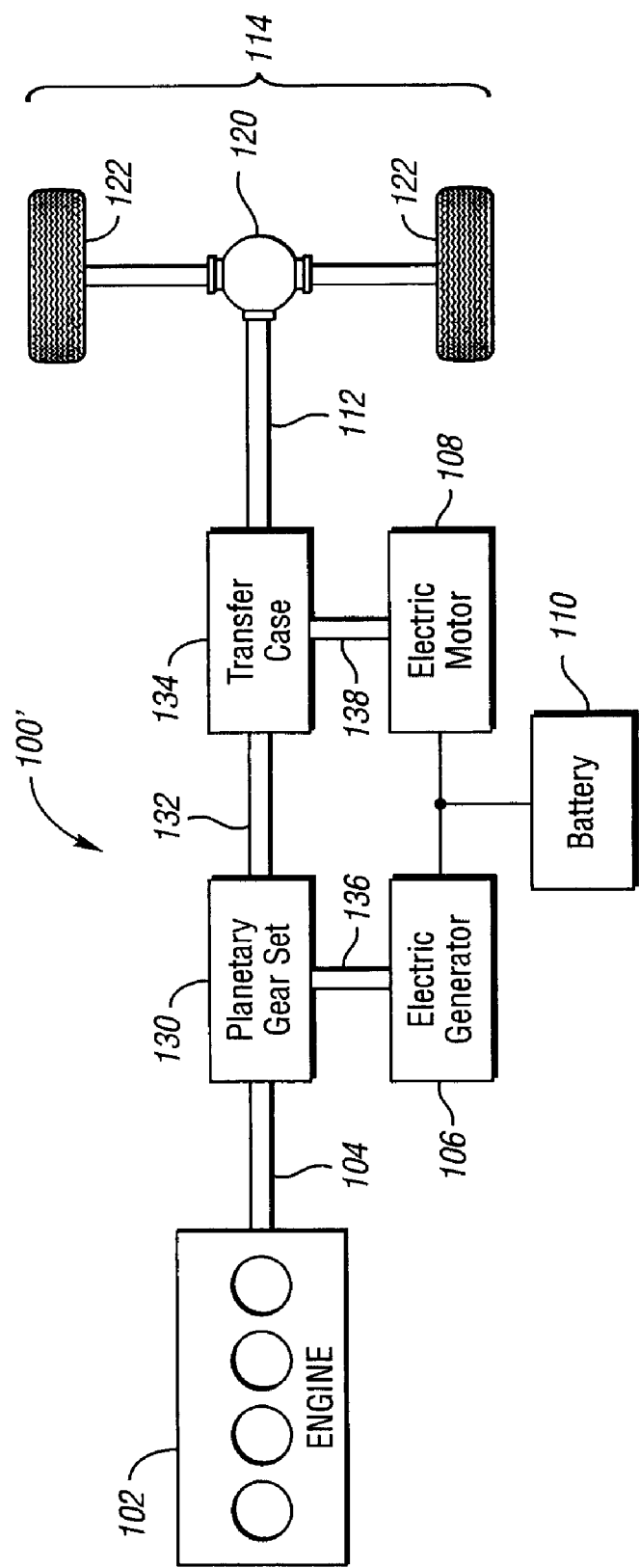
FIG. 10 is a diagram of a series-parallel HEV configuration.

Referring to FIG. 10, a diagram of a series-parallel HEV powertrain system 100' is shown. The HEV 100" generally includes a planetary gearset 130 mechanically coupled to the engine 102 through the drive shaft 104. The planetary gearset 130 is mechanically coupled to a transfer case 134 through a drive shaft 132. The transfer case 134 is mechanically coupled to the differential/axle assembly 120 through the drive shaft 112.

HEV 100' generally further includes the electric generator 106 mechanically coupled to the gearset 130 through a drive shaft 136. The electric machine 108 is generally mechanically coupled to the transfer case 134 through a drive shaft 138. The battery 110, the generator 106, and the electric machine 108 are generally electrically coupled together.

The series-parallel configuration 100' is a combination of series and parallel configurations. The engine 102, the generator 106, the electric machine 108 and the wheels 122 are mechanically linked together through the planetary gear set 130 and the transfer case 134. The engine 102 power is generally split up and transmitted through two paths.

The first path, a series path, transfers power through the generator 106, the electric machine 108, and the transfer case 134 to the wheels 122. Along the series path, part of the mechanical power from the engine 102 is generally first converted into electrical energy using the generator 106. A portion of the electrical power generated by the generator 106 may be converted into mechanical energy via the electric machine 108 and transmitted to the wheels 122 from the electric machine 108 through the transfer case 134, the shaft 112 and the assembly 120. The remaining electrical power that is generated by the generator 106 will generally be converted into electrochemical power by the battery 110.

The second path, a parallel path, transfers power through the planetary gear set 130 and the transfer case 134 to the wheels 122. Along the parallel path, the second portion of engine 102 power is transmitted mechanically to the wheels 122. The electric machine 108 drive shaft 138 is connected to the transfer case 134, and provides supplemental torque and adjustment to the engine 102 load.

The series-parallel HEV 100' works at all times as a combination of series and parallel configurations. Therefore, the series-parallel HEV 100' can combine the positive aspects (i.e., the advantages) of the both series and the parallel HEV configurations when the system is controlled properly (e.g., via the present invention).

Invention Application for a Series-Parallel Configuration

When the series-parallel HEV configuration 100' as illustrated in FIG. 10 is compared with the series HEV configuration 100 illustrated in FIG. 1, the electrical link (i.e., coupling, connection, interface, etc.) of the series-parallel HEV 100' is the same as that of the series HEV 100. Therefore, the system and method for battery protection of the present invention can be applied directly to the series-parallel HEV configuration 100'.

The system and method of the present invention generally provide the advantages of robust control for preventing the battery from over charging or over discharging, which will generally prolong battery life and prevent vehicle from a quit on road condition due to the battery exceeding performance limits.

Figure 11:
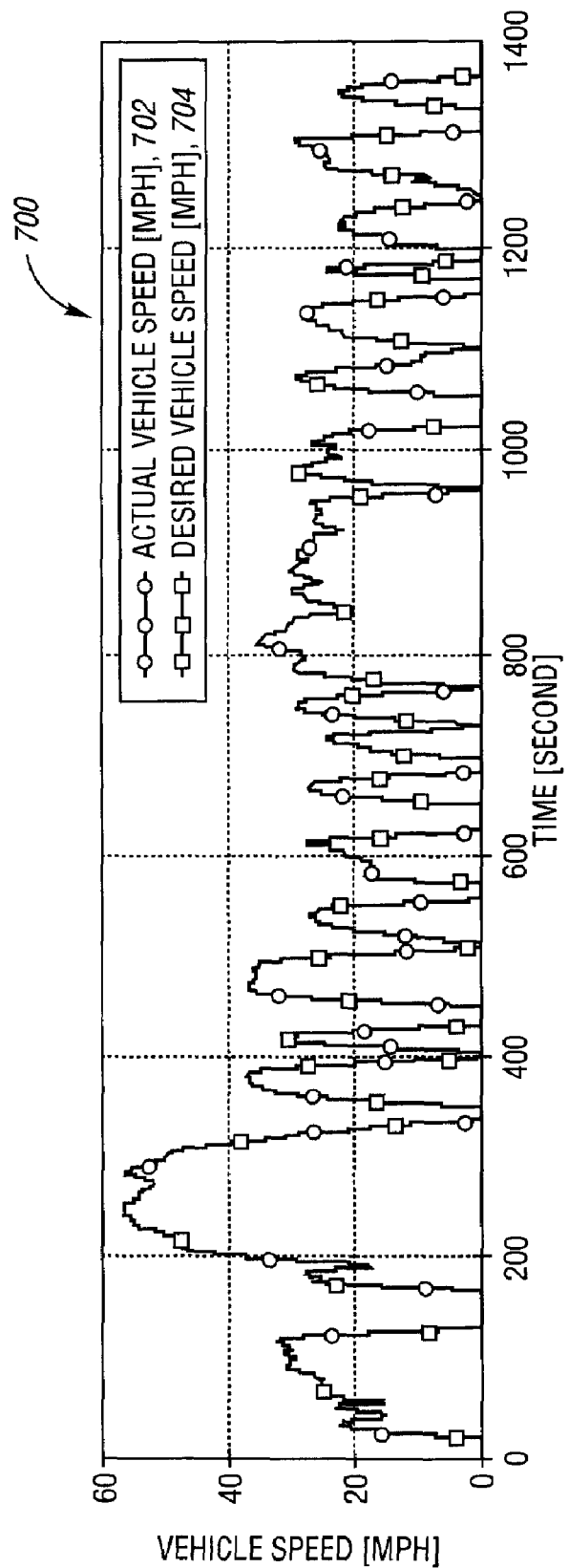
FIG. 11 is a plot of actual and desired vehicle speed for a series HEV having a battery protection strategy of the present invention.

Referring to FIG. 11, a diagram 700 of plots illustrating actual and desired vehicle speed, plots 702 and 704, respectively, for a series HEV with the battery protection strategy of the present invention are shown. The present invention provides superior matching of actual and desired vehicle speed (i.e., the actual and desired vehicle speeds substantially overlap) while maintaining the battery within the specified operation range.

While the best mode for carrying out the invention has been described in detail, those familiar with the art to which this invention relates will recognize various alternative designs and embodiments for practicing the invention as defined by the following claims.

The invention claimed is:

1. A method for controlling a hybrid powertrain system for an automotive vehicle operated by a user, the system having an engine, an electric machine that performs as a motor in one mode of operation and performs as a generator in another mode of operation, a battery connected to the electric machine, and a generator configured to receive mechanical power from the engine and to present electrical power to at least one of the electric machine and the battery, and at least one of the engine and the electric machine establish a power source for providing power to vehicle traction wheels, the method comprising the steps of:

determining a first power state of the hybrid powertrain system;

limiting electrical power generated by the generator to the minimum of the rated power limit of the generator and the first power state, when the first power state is greater than zero; and limiting the electrical power generated by the generator to zero, and limiting the power limit of the electric machine during generating to a first operating condition of the hybrid powertrain system, when the first power state is less than or equal to zero, to provide overcharge protection to the battery.

2. The method set forth in claim 1 wherein the first power state includes the sum of the actual mechanical output power of the electric machine, the actual power loss of the electric machine, the actual total power consumed by the auxiliary loads, and the battery charge power limit; and the first operating condition includes the negative of the sum of the actual power loss of the electric machine, the actual total power consumed by the auxiliary loads, and the battery charge power limit.

3. The method set forth in claim 2 wherein a battery charge current limit to provide both over-current and over-voltage protection to the battery is equal to the minimum of the rated battery charge current limit and a battery charge current limit predetermined by testing for avoiding battery over-voltage, and the battery charge power limit is equal to the minimum of the rated battery charge power limit and the product of battery voltage and the battery charge current limit.

4. The method set forth in claim 1 further, when engine start is of higher priority to the user than drive performance, including the steps of:

limiting the power limit of the electric machine during motoring to the minimum of the rated power limit of the electric machine, and the negative of a second operating condition of the hybrid powertrain system, when the second operating condition is less than zero;

determining when a third operating condition of the hybrid powertrain system is less than zero, when the second operating condition is equal to or greater than zero;

limiting the auxiliary loads to the minimum power for maintaining the vehicle operation, and limiting the power limit of the electric machine during motoring to the minimum of the rated power limit of the electric machine and the negative of the third operating condition, when the third operating condition is less than zero; and adjusting an engine start strategy to provide earlier starting of the engine, when both the second and the third operating conditions are equal to or greater than zero, to provide over-discharge protection to the battery.

5. The method set forth in claim 4, wherein the second operating condition includes the sum of the discharge power limit of the battery, the actual total power consumed by the auxiliary loads, the negative of the actual electrical power output of the generator, and the actual power loss of the electric machine; and the third operating condition includes the sum of the discharge power limit of the battery, the minimum auxiliary power for maintaining vehicle operation, the negative of the actual electrical power output of the generator, and the actual power loss of the electric machine.

6. The method set forth in claim 5 wherein a battery discharge current limit to provide both over discharge current and under-voltage protection for the battery is equal to the maximum of the rated battery discharge current limit and a battery discharge current limit predetermined by testing for avoiding battery under-voltage, and the discharge power limit of the battery to provide over-discharge protection to the battery equals the maximum of the rated battery discharge power limit and the product of the battery voltage and the battery discharge current limit.

7. The method set forth in claim 1 further, when drive performance is of higher priority to the user than engine start, including the steps of:

limiting the electrical power of the generator during motoring to the maximum of the negative of the rated power limit of the generator, and a fourth operating condition of the hybrid powertrain system, when the fourth operating condition is less than zero;

determining when a fifth operating condition of the hybrid powertrain system is less than zero, when the fourth operating condition is equal to or greater than zero;

limiting the actual total power consumed by the auxiliary loads to the minimum auxiliary power requested, and limiting the electrical power of the generator during motoring to the maximum of the negative of the rated power limit of the generator and the fifth operating condition, when the fifth operating condition is less than zero; and adjusting an engine start strategy to provide earlier starting of the engine, when the both the fourth and the fifth operating conditions are equal to or greater than zero, to provide over-discharge protection to the battery.

8. The method set forth in claim 7, wherein the fourth operating condition includes the sum of the discharge power limit of the battery, the actual total power consumed by the auxiliary loads, the actual mechanical output power of the electric machine, and the actual power loss of the electric machine; and the fifth operating condition includes the sum of the discharge power limit of the battery, the minimum auxiliary power requested, the actual mechanical output power of the electric machine, and the actual power loss of the electric machine.

9. A system for controlling a hybrid powertrain for an automotive vehicle operated by a user, the system comprising:

an engine;

an electric machine that performs as a motor in one mode of operation and performs as a generator in another mode of operation;

a battery connected to the electric machine, wherein at least one of the engine and the electric machine establish a power source for providing power to vehicle traction wheels;

a generator configured to receive mechanical power from the engine and to present electrical power to at least one of the electric machine and the battery; and a controller configured to:

determine a first power state of the hybrid powertrain system;

limit electrical power generated by the generator to the minimum of the rated power limit of the generator and the first power state, when the first power state is greater than zero; and limit the electrical power generated by the generator to zero, and limit the power limit of the electric machine during generating to a first operating condition of the hybrid powertrain system, when the first power state is less than or equal to zero, to provide over-charge protection to the battery.

10. The system set forth in claim 9, wherein the first power state includes the sum of the actual mechanical output power of the electric machine, the actual power loss of the electric machine, the actual total power consumed by the auxiliary loads, and the battery charge power limit; and the first operating condition includes the negative of the sum of the actual power loss of the electric machine, the actual total power consumed by the auxiliary loads, and the battery charge power limit.

11. The system set forth in claim 10 wherein a battery charge current limit to provide both over-current and over-voltage protection to the battery is equal to the minimum of the rated battery charge current limit and a battery charge current limit predetermined by testing for avoiding battery over-voltage, and the battery charge power limit is equal to the minimum of the rated battery charge power limit and the product of battery voltage and the battery charge current limit.

12. The system set forth in claim 9, wherein, when engine start is of higher priority to the user than drive performance, the controller is further configured to:

limit the power limit of the electric machine during motoring to the minimum of the rated power limit of the electric machine, and the negative of a second operating condition of the hybrid powertrain system, when the second operating condition is less than zero;

determine when a third operating condition of the hybrid powertrain system is less than zero, when the second operating condition is equal to or greater than zero;

limit the auxiliary loads to the minimum power for maintaining the vehicle operation, and limit the power limit of the electric machine during motoring to the minimum of the rated power limit of the electric machine and the negative of the third operating condition, when the third operating condition is less than zero; and adjust an engine start strategy to provide earlier starting of the engine, when both the second and the third operating conditions are equal to or greater than zero, to provide over-discharge protection to the battery.

13. The system set forth in claim 12, wherein the second operating condition includes the sum of the discharge power limit of the battery, the actual total power consumed by the auxiliary loads, the negative of the actual electrical power output of the generator, and the actual power loss of the electric machine; and the third operating condition includes the sum of the discharge power limit of the battery, the minimum auxiliary power for maintaining vehicle operation, the negative of the actual electrical power output of the generator, and the actual power loss of the electric machine.

14. The system set forth in claim 13 wherein a battery discharge current limit to provide both over discharge current and under-voltage protection for the battery is equal to the maximum of the rated battery discharge current limit and a battery discharge current limit predetermined by testing for avoiding battery under-voltage, and the discharge power limit of the battery to provide over-discharge protection to the battery equals the maximum of the rated battery discharge power limit and the product of the battery voltage and the battery discharge current limit.

15. The system set forth in claim 9, wherein, when drive performance is of higher priority to the user than engine start, the controller is further configured to:

limit the electrical power of the generator during motoring to the maximum of the negative of the rated power limit of the generator, and a fourth operating condition of the hybrid powertrain system, when the fourth operating condition is less than zero;

determine when a fifth operating condition of the hybrid powertrain system is less than zero, when the fourth operating condition is equal to or greater than zero;

limit the actual total power consumed by the auxiliary loads to the minimum auxiliary power requested, and limit the electrical power of the generator during motoring to the maximum of the negative of the rated power limit of the generator and the fifth operating condition, when the fifth operating condition is less than zero; and adjust an engine start strategy to provide earlier starting of the engine, when both the fourth and the fifth operating conditions are equal to or greater than zero, to provide over-discharge protection to the battery.

16. The system set forth in claim 15, wherein the fourth operating condition includes the sum of the discharge power limit of the battery, the actual total power consumed by the auxiliary loads, the actual mechanical output power of the electric machine, and the actual power loss of the electric machine; and the fifth operating condition includes the sum of the discharge power limit of the battery, the minimum auxiliary power requested, the actual mechanical output power of the electric machine, and the actual power loss of the electric machine.

17. The system set forth in claim 9, wherein the vehicle is configured as at least one of a series hybrid electric vehicle, and a series-parallel hybrid electric vehicle.

18. A vehicle system controller (VSC) for controlling a hybrid powertrain system for an automotive vehicle operated by a user, the system having an engine, an electric machine that performs as a motor in one mode of operation and performs as a generator in another mode of operation, a battery connected to the electric machine, and a generator configured to receive mechanical power from the engine and to present electrical power to at least one of the electric machine and the battery, and at least one of the engine and the electric machine establish a power source for providing power to vehicle traction wheels, the vehicle system controller comprising:

a regulator configured to receive a commanded engine speed signal and an actual engine speed signal, and present a transient state portion of a commanded generator output torque signal for regulation of speed of the engine;

a first memory including a model for over-charge protection of the battery that receives a voltage of the battery, a temperature of the battery, and a state of charge (SOC) of the battery, and presents a first charge current limit of the battery for over-voltage protection, a second charge current limit signal for over-current charge protection, and a battery charge power limit; and a second memory including a model for under-voltage protection for the battery that receives the voltage of the battery, the temperature of the battery, and the SOC of the battery, and presents a first discharge current limit of the battery for under-voltage protection, a second battery discharge current limit for over-current discharge protection, and a battery discharge power limit.

19. The controller set forth in claim 18 wherein the controller is configured to:

determine a first power state of the hybrid powertrain system;

limit electrical power generated by the generator to the minimum of the rated power limit of the generator and the first power state, when the first power state is greater than zero; and limit the electrical power generated by the generator to zero, and limit the power limit of the electric machine during generating to a first operating condition of the hybrid powertrain system, when the first power state is less than or equal to zero, to provide over-charge protection to the battery.

20. The controller set forth in claim 19, wherein the first power state includes the sum of the actual mechanical output power of the electric machine, the actual power loss of the electric machine, the actual total power consumed by the auxiliary loads, and the battery charge power limit; and the first operating condition includes the negative of the sum of the actual power loss of the electric machine, the actual total power consumed by the auxiliary loads, and the battery charge power limit.

21. The controller set forth in claim 20 wherein a battery charge current limit to provide both over-current and over-voltage protection to the battery is equal to the minimum of the rated battery charge current limit and a battery charge current limit predetermined by testing for avoiding battery over-voltage, and the battery charge power limit is equal to the minimum of the rated battery charge power limit and the product of battery voltage and the battery charge current limit.

22. The controller set forth in claim 19, wherein, when engine start is of higher priority to the user than drive performance, the controller is further configured to:

limit the power limit of the electric machine during motoring to the minimum of the rated power limit of the electric machine, and the negative of a second operating condition of the hybrid powertrain system, when the second operating condition is less than zero;

determine when a third operating condition of the hybrid powertrain system is less than zero, when the second operating condition is equal to or greater than zero;

limit the auxiliary loads to the minimum power for maintaining the vehicle operation, and limit the power limit of the electric machine during motoring to the minimum of the rated power limit of the electric machine and the negative of the third operating condition, when the third operating condition is less than zero; and adjust an engine start strategy to provide earlier starting of the engine, when both the second and the third operating conditions are equal to or greater than zero, to provide over-discharge protection to the battery.

23. The controller set forth in claim 22, wherein the second operating condition includes the sum of the discharge power limit of the battery, the actual total power consumed by the auxiliary loads, the negative of the actual electrical power output of the generator, and the actual power loss of the electric machine; and the third operating condition includes the sum of the discharge power limit of the battery, the minimum auxiliary power for maintaining vehicle operation, the negative of the actual electrical power output of the generator, and the actual power loss of the electric machine.

24. The controller set forth in claim 23 wherein a battery discharge current limit to provide both over discharge current and under-voltage protection for the battery is equal to the maximum of the rated battery discharge current limit and a battery discharge current limit predetermined by testing for avoiding battery under-voltage, and the discharge power limit of the battery to provide over-discharge protection to the battery equals the maximum of the rated battery discharge power limit and the product of the battery voltage and the battery discharge current limit.

25. The controller set forth in claim 19, wherein, when drive performance is of higher priority to the user than engine start, the controller is further configured to:

limit the electrical power of the generator during motoring to the maximum of the negative of the rated power limit of the generator, and a fourth operating condition of the hybrid powertrain system, when the fourth operating condition is less than zero;

determine when a fifth operating condition of the hybrid powertrain system is less than zero, when the fourth operating condition is equal to or greater than zero;

limit the actual total power consumed by the auxiliary loads to the minimum auxiliary power requested, and limit the electrical power of the generator during motoring to the maximum of the negative of the rated power limit of the generator and the fifth operating condition, when the fifth operating condition is less than zero; and adjust an engine start strategy to provide earlier starting of the engine, when both the fourth and the fifth operating conditions are equal to or greater than zero, to provide over-discharge protection to the battery.

26. The controller set forth in claim 25, wherein the fourth operating condition includes the sum of the discharge power limit of the battery, the actual total power consumed by the auxiliary loads, the actual mechanical output power of the electric machine, and the actual power loss of the electric machine; and the fifth operating condition includes the sum of the discharge power limit of the battery, the minimum auxiliary power requested, the actual mechanical output power of the electric machine, and the actual power loss of the electric machine.

* * * * *